US007891716B2

(12) United States Patent
Orr et al.

(10) Patent No.: US 7,891,716 B2
(45) Date of Patent: Feb. 22, 2011

(54) COVER INSTALLATION TOOL

(75) Inventors: Shawn G. Orr, Grand Rapids, MI (US); Michael J. Oldham, Kalamazoo, MI (US)

(73) Assignee: The Viking Corporation, Hastings, MI (US)

( * ) Notice: Subject to any disclaimer, the term of this patent is extended or adjusted under 35 U.S.C. 154(b) by 337 days.

(21) Appl. No.: 12/111,661

(22) Filed: Apr. 29, 2008

(65) Prior Publication Data

US 2009/0266203 A1 Oct. 29, 2009

(51) Int. Cl.
*B25J 1/00* (2006.01)

(52) U.S. Cl. .................................... 294/19.1; 294/99.1

(58) Field of Classification Search ................ 294/19.1, 294/19.2, 99.1; 81/53.11, 53.12; 56/332
See application file for complete search history.

(56) References Cited

U.S. PATENT DOCUMENTS

| | | | | | |
|---|---|---|---|---|---|
| 844,601 | A | * | 2/1907 | Koerper | 56/333 |
| 2,551,486 | A | * | 5/1951 | Burden | 294/19.2 |
| 3,952,488 | A | * | 4/1976 | Coulter | 56/333 |
| 4,006,581 | A | * | 2/1977 | Freeman | 56/333 |
| 4,313,632 | A | * | 2/1982 | King et al. | 294/19.2 |
| 4,663,996 | A | * | 5/1987 | Grudgfield et al. | 81/53.11 |
| 4,787,632 | A | * | 11/1988 | Nigrelli et al. | 473/285 |
| 5,809,850 | A | * | 9/1998 | Tickner | 81/53.11 |
| 6,048,014 | A | * | 4/2000 | Stefanik | 294/99.1 |
| 6,591,716 | B2 | * | 7/2003 | Wantz | 81/53.1 |
| 7,311,345 | B2 | * | 12/2007 | Kerr | 294/19.2 |

FOREIGN PATENT DOCUMENTS

GB 2 271 937 * 5/1994

OTHER PUBLICATIONS

Escutcheon Tool for Recessed Automatic Sprinklers, Globe Fire Sprinkler Corporation, Bulletin ASB-ESCTL, Rev. #2 (Aug. 2002) (1 page).
Mirage Concealed Cover Installer Tool, The Viking Corporation, New sprinkler bulletin, Form No. F_112007 (Dec. 7, 2007) (1 page).

* cited by examiner

*Primary Examiner*—Dean J Kramer
(74) *Attorney, Agent, or Firm*—Harness, Dickey & Pierce, P.L.C.

(57) ABSTRACT

An installation tool may include an extension member, a body portion disposed on the extension member, and a plurality of fingers flexibly protruding from the body portion. The plurality of fingers are adapted to releasably engage a cover assembly. The plurality of fingers and the body portion cooperate to retain the cover assembly in a first direction and allow disengagement of the cover assembly in a second direction.

18 Claims, 7 Drawing Sheets

COVER INSTALLATION TOOL

FIELD

The present disclosure relates to an installation tool and in particular to an installation tool for installing a cover for a concealed fire protection sprinkler.

BACKGROUND

The statements in this section merely provide background information related to the present disclosure and may not constitute prior art.

Fire protection sprinklers are commonly mounted to ceilings of residential and commercial buildings. Such sprinklers are often housed within an opening in the ceiling in such a manner that the sprinkler head does not protrude below the surface of the ceiling when not in use. A decorative cover plate may be installed over the opening in the ceiling to conceal the sprinkler, improving the aesthetic qualities of the sprinkler system. In response to heat, the solder holding the cover in place melts and the cover falls away from the sprinkler and the sprinkler trigger mechanism is then activated by the heat to release a plug device to allow the sprinkler to discharge water below the ceiling.

Typically, a worker must stand atop a ladder or scaffolding to reach the opening in the ceiling to install the cover plate. When installing cover plates over multiple sprinklers, the worker must then climb down from the ladder or scaffolding, move the ladder or scaffolding below the next sprinkler, and climb back up to install the next cover, repeating this process for each of the sprinklers in a given building. This process is time-consuming and costly.

SUMMARY

An installation tool may include an extension member, a body portion disposed on the extension member, and a plurality of fingers flexibly protruding from the body portion. The plurality of fingers may be adapted to releasably engage a cover assembly. The plurality of fingers and the body portion cooperate to retain the cover assembly in a first direction and allow disengagement of the cover assembly in a second direction.

A method for installing a cover assembly onto a sprinkler assembly may include pressing a first portion of the cover assembly into releasable engagement with an installation tool having an extension member, applying a force to the extension member in a first direction along a longitudinal axis of the extension member to remotely press a second portion of the cover assembly into engagement with the sprinkler assembly, and applying a force to the extension member in a second direction along the longitudinal axis of the extension member to disengage the cover assembly from the installation tool, the cover assembly maintaining engagement with the sprinkler assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
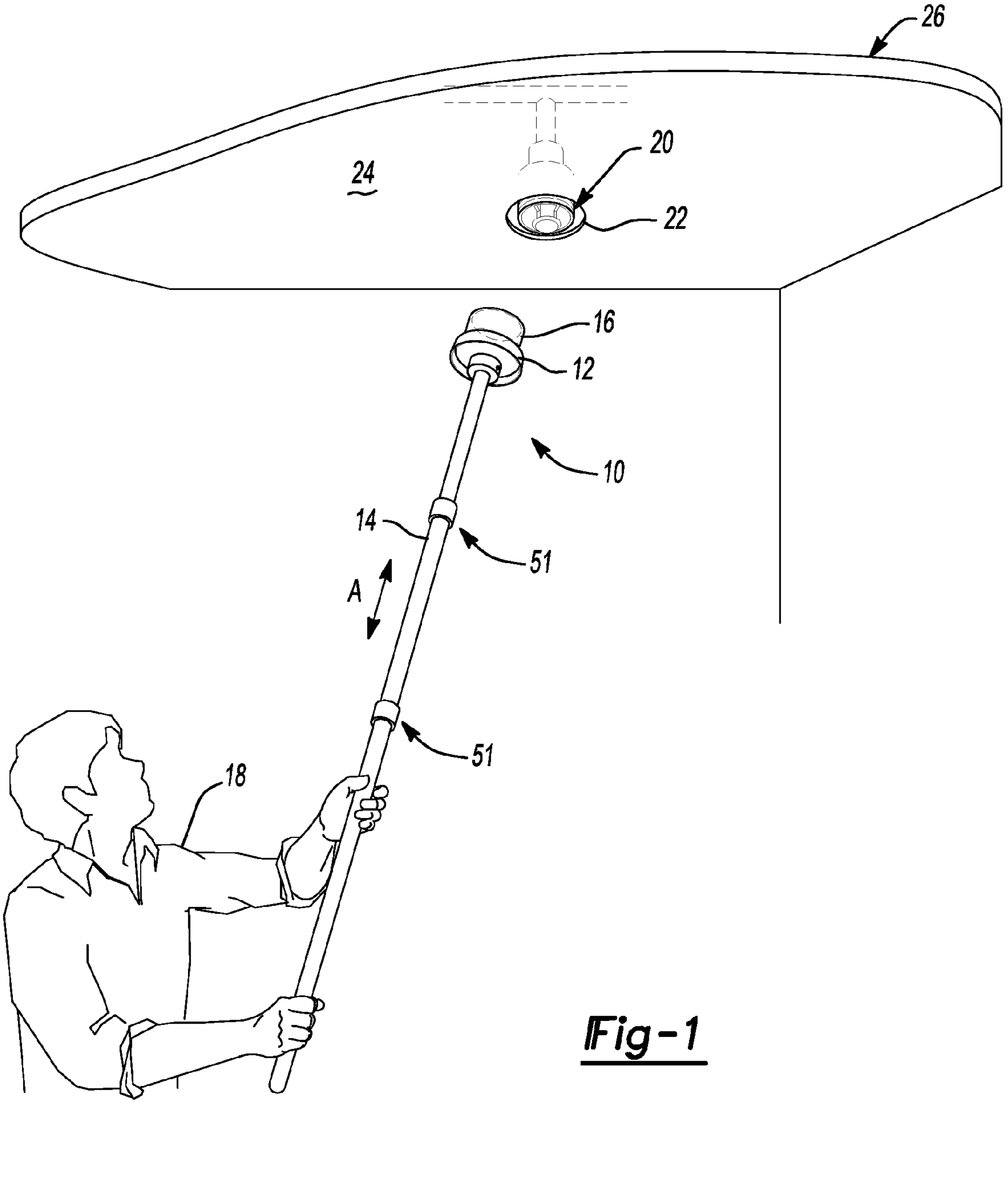
FIG. 1 is a partial perspective view of an operator installing a cover assembly onto a sprinkler assembly according to the principles of the present disclosure.

The following description is merely exemplary in nature and is not intended to limit the present disclosure, application, or uses. It should be understood that throughout the drawings, corresponding reference numerals indicate like or corresponding parts and features.

With reference to FIGS. 1-10, an installation tool 10 is provided and includes a body portion 12 and an extension member 14. The installation tool 10 may releasably engage a sprinkler cover assembly 16 and extend the reach of an operator 18, allowing the operator 18 to install the cover assembly 16 onto a sprinkler assembly 20. The sprinkler assembly 20 may be installed above an opening 22 in a ceiling 24 of a building 26, for example. It should be appreciated that the sprinkler assembly 20 may be installed in a sidewall of the building 26, or any other location suited for an intended use of the sprinkler assembly 20.

Figure 2:
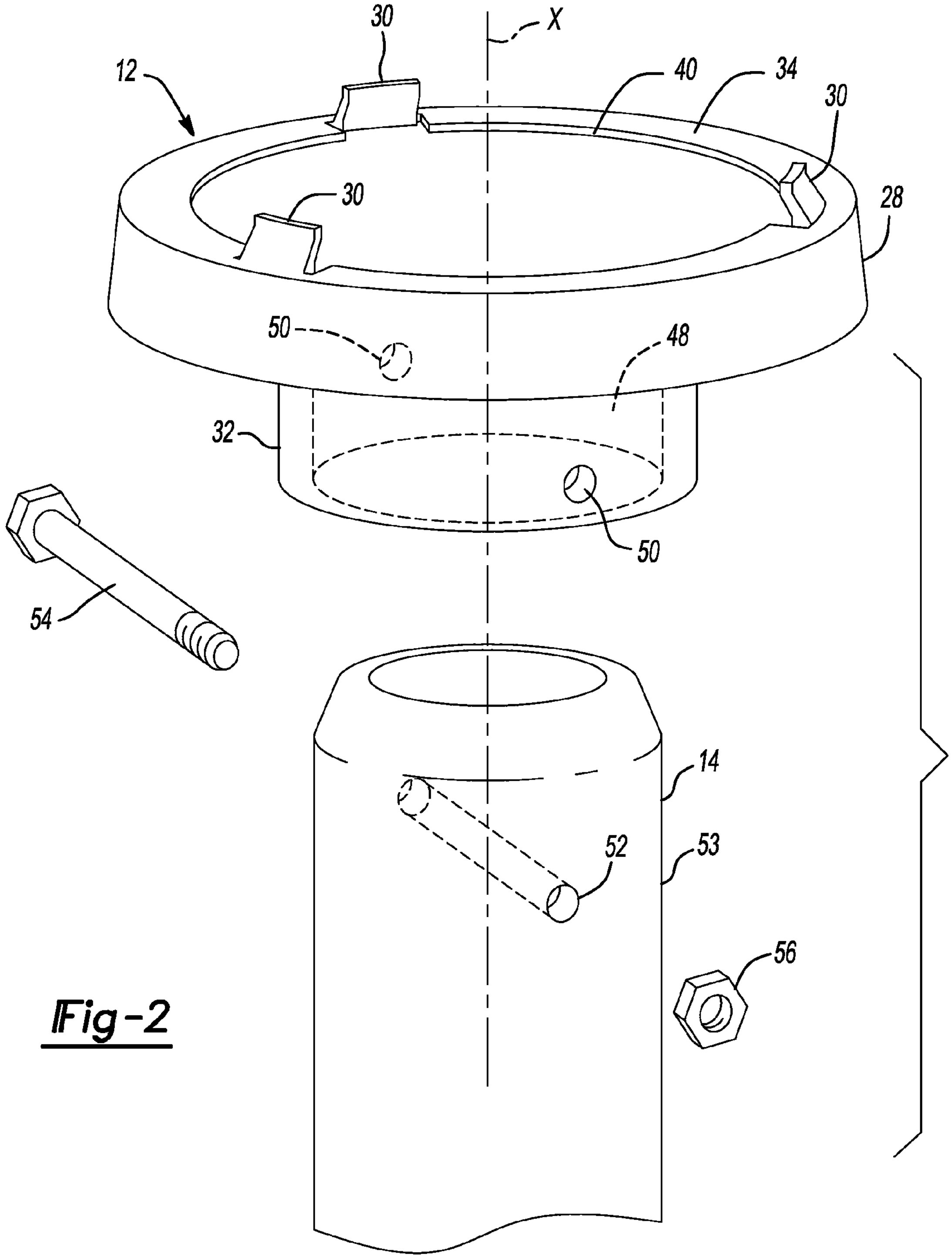
FIG. 2 is a partial exploded view of the installation tool of FIG. 1.

With reference to FIG. 2, the body portion 12 may include a head portion 28, a plurality of fingers 30, and a neck portion 32. The head portion 28, the plurality of fingers 30, and the neck portion 32 may be integrally formed, glued, fastened, welded, or otherwise suitably joined together. The body portion 12 may be formed from a polymer, metal, wood, or other suitable material known in the art or combinations thereof.

Figure 3:
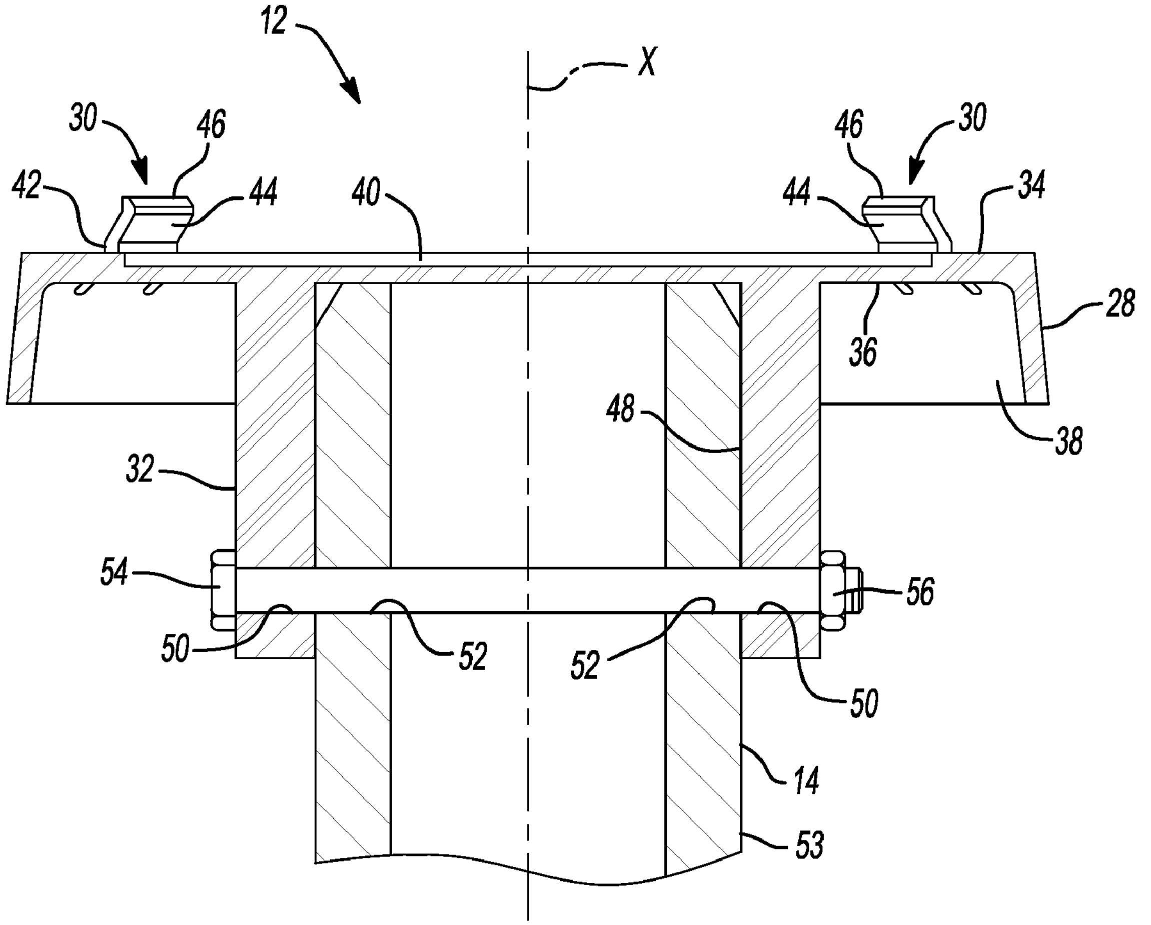
FIG. 3 is a partial cross-sectional view of the installation tool of FIG. 1.

The head portion 28 may be substantially cylindrical, and may include a front face 34 and a back face 36 disposed in a cavity 38 (FIG. 3). It should be appreciated that the head portion 28 could include a solid cross-section and could be frusto-conical, a polygonal prism, or any other suitable shape.

The front face 34 may include a generally cylindrical recess 40. The plurality of fingers 30 may protrude from the front face 34 and/or the recess 40, and may be generally angled inward towards a longitudinal axis X of the installation tool 10. The fingers 30 may be resiliently flexible and generally rectangular or any other suitable shape. The plurality of fingers 30 may be disposed in a circular pattern and each finger 30 may be equidistantly spaced relative to each other and the longitudinal axis X.

Each finger 30 may include a stem 42, a leg portion 44 and a lip portion 46 (FIGS. 7-10). The lip portion 46 may protrude from the leg portion 44 at an outward angle, away from the longitudinal axis X. It should be appreciated that the body portion 12 could include a single, continuous finger 30 protruding from the front face 34 and/or the circular recess 40 and extending 360 degrees about the longitudinal axis X, or any number of separately formed fingers.

The neck portion 32 may be generally cylindrical and may protrude from the back face 36 of the head portion 28 along the longitudinal axis X (FIG. 3). The neck portion 32 may include a cavity 48 and an aperture 50 disposed through the neck portion 32 and the cavity 48.

The extension member 14 may be an elongated rigid pole extending along the longitudinal axis X and may include an aperture 52 extending through a diameter 53 of the extension member 14 generally perpendicular to the longitudinal axis X. The extension member 14 may include one or more telescoping features 51, whereby the length of the extension member 14 may be expanded and/or contracted in the longitudinal direction as illustrated by arrow A in FIG. 1, to allow use with ceilings of various heights.

The extension member 14 may be received within the cavity 48 of the body portion 12, such that the apertures 50, 52 are disposed substantially concentric to each other. In this configuration, a fastener 54 may be disposed through the apertures 50, 52, retaining the extension member 14 within the cavity 48. The fastener 54 may be slidably engaged with the apertures 50, 52 and may threadably engage a nut 56, for example, to retain the fastener 54 therein (FIG. 3). Additionally or alternatively, the fastener 54 may be threadably engaged with the aperture 50 or glued, press fit, or otherwise fixed therein. The body portion 12 can also be permanently fixed to the extension member 14.

Figure 4:
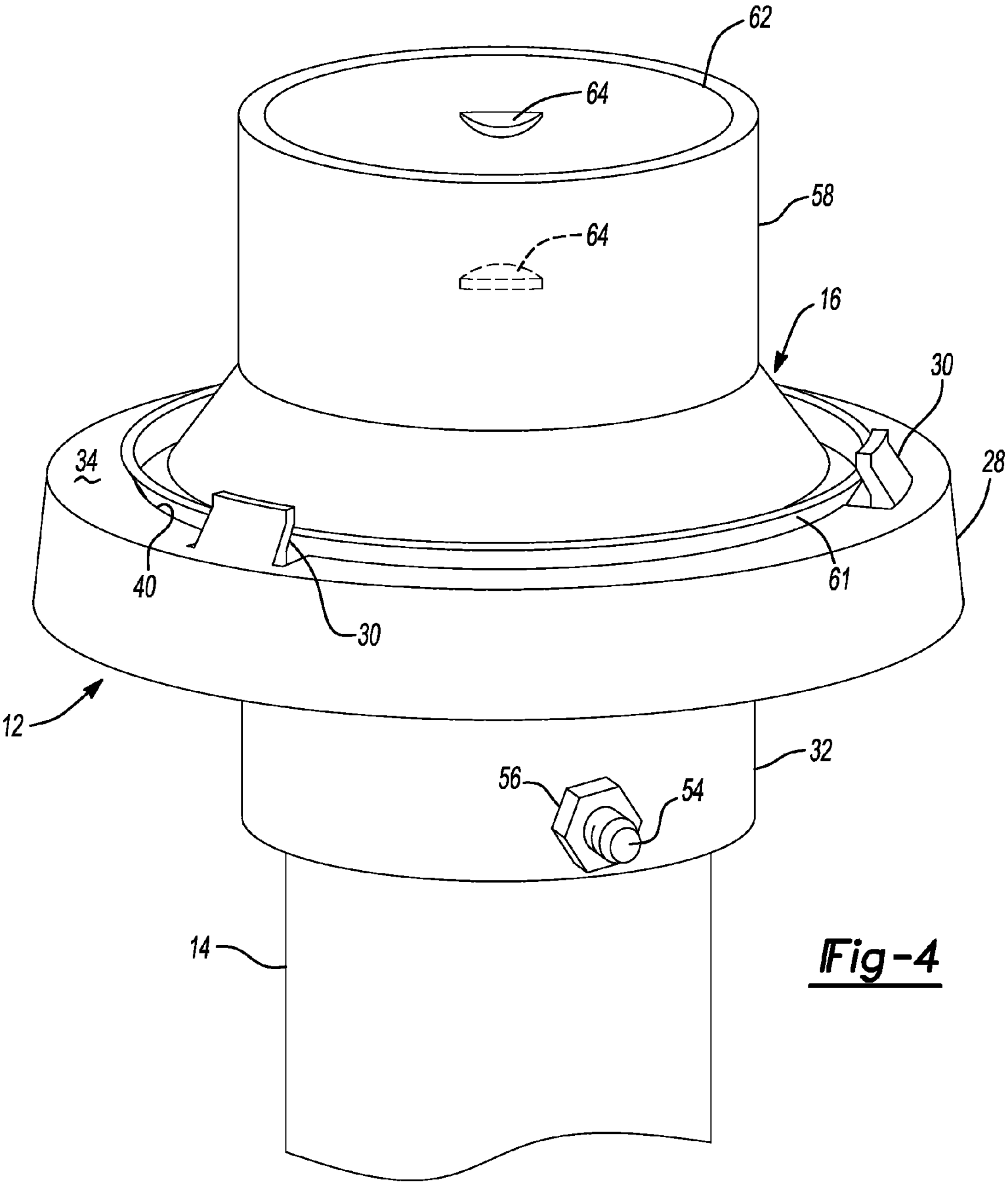
FIG. 4 is a partial perspective view of the installation tool engaging a cover assembly according to the principles of the present disclosure.
Figure 6:
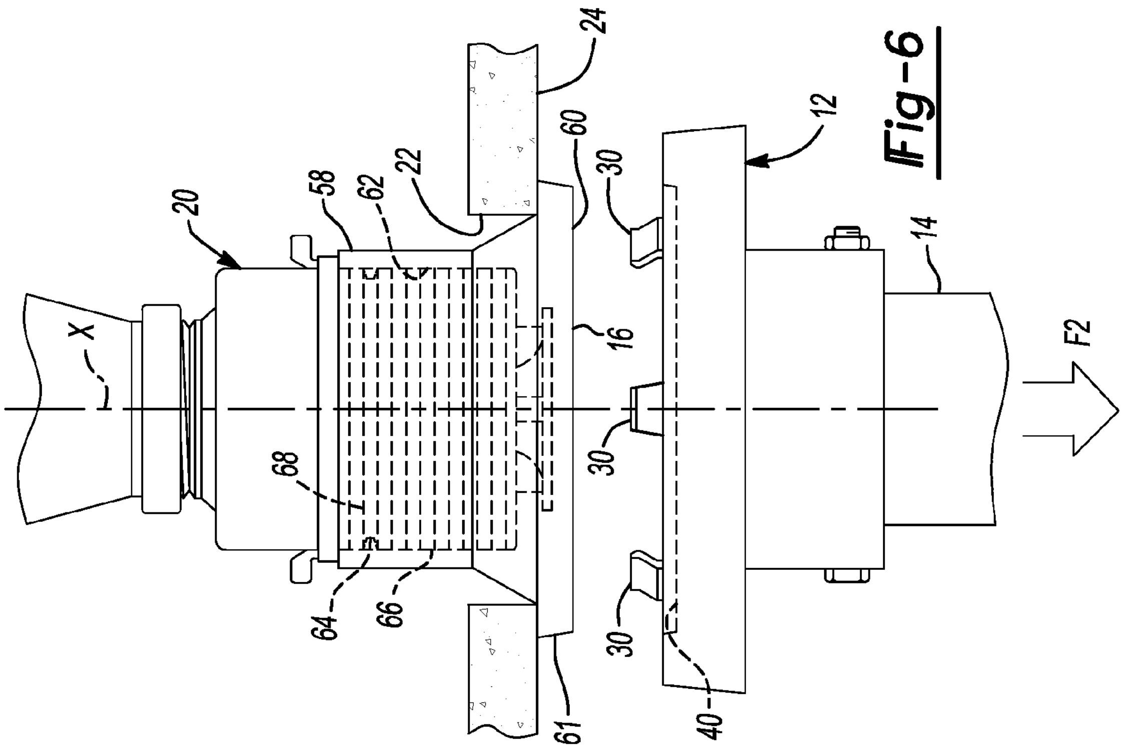
FIG. 6 is a partial side view of the cover assembly installed onto the sprinkler assembly and disengaged from the installation tool.
Figure 5:
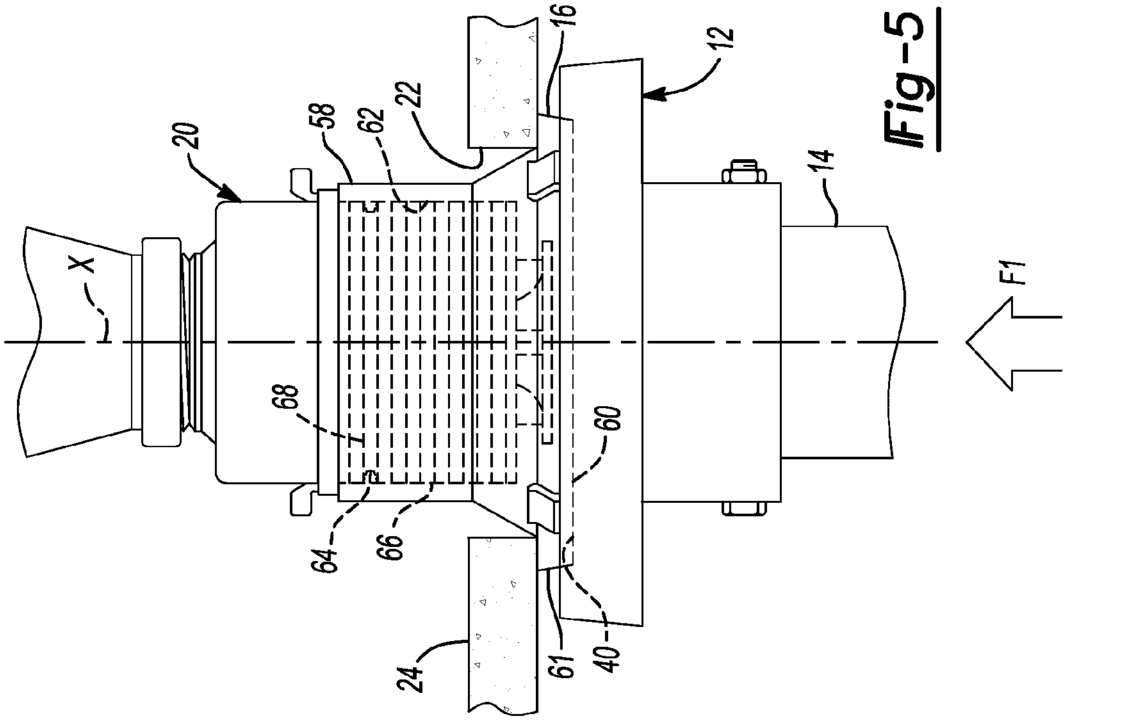
FIG. 5 is a partial side view of the installation tool pressing the cover assembly onto the sprinkler assembly according to the principles of the present disclosure.

With reference to FIGS. 4-6, the cover assembly 16 may engage the sprinkler assembly 20 and cover the opening 22 in the ceiling 24. The cover assembly 16 may include a hollow sleeve portion 58 and a cover plate 60 having an outer rim 61. The cover plate 60 is attached to the sleeve portion 58 by a heat sensitive solder that releases the cover plate 60 at a predetermined temperature. An inner diameter 62 of the sleeve portion 58 may include one or more protuberances 64. The sprinkler assembly 20 may include a neck portion 66. One or more thread-like ribs 68 may be disposed around the neck portion 66. The sleeve portion 58 may slide over the neck portion 66. The protuberances 64 may be pressed into releasable engagement with the one or more ribs 68.

With reference to FIGS. 1-10, operation of the installation tool 10 will be described in detail. The installation tool 10 may engage the cover plate 60 and extend the reach of the operator 18, enabling the operator 18 to install the cover assembly 16 onto the sprinkler assembly 20 without a ladder, scaffolding, or the like.

Figure 7:
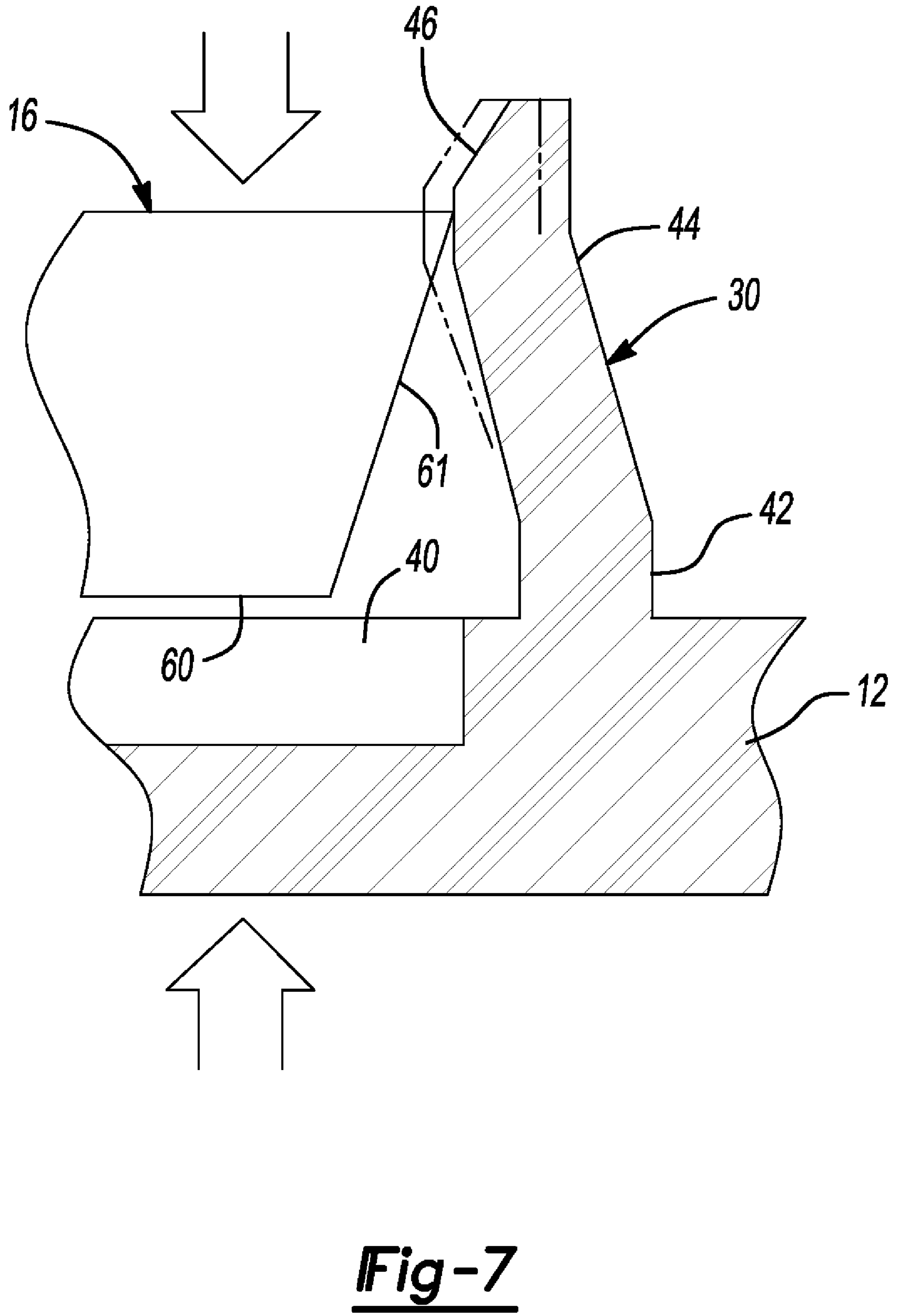
FIG. 7 is a partial cross-sectional view of a finger of the installation tool flexing to engage the cover assembly according to the principles of the present disclosure.
Figure 8:
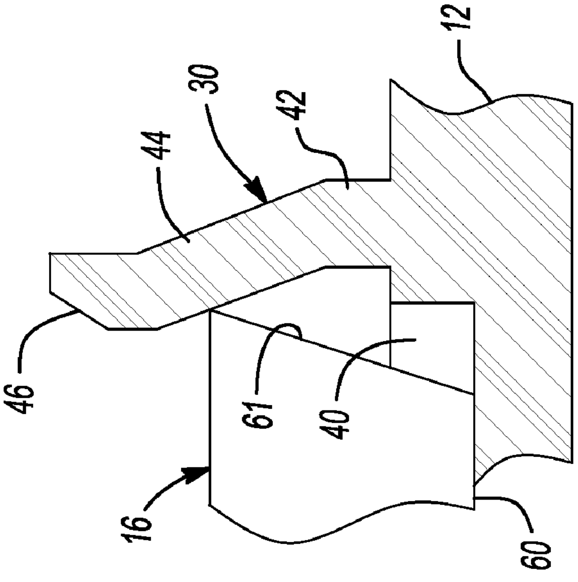
FIG. 8 is a partial cross-sectional view of the cover assembly fully engaged with the finger and a body portion of the installation tool according to the principles of the present disclosure.
Figure 9:
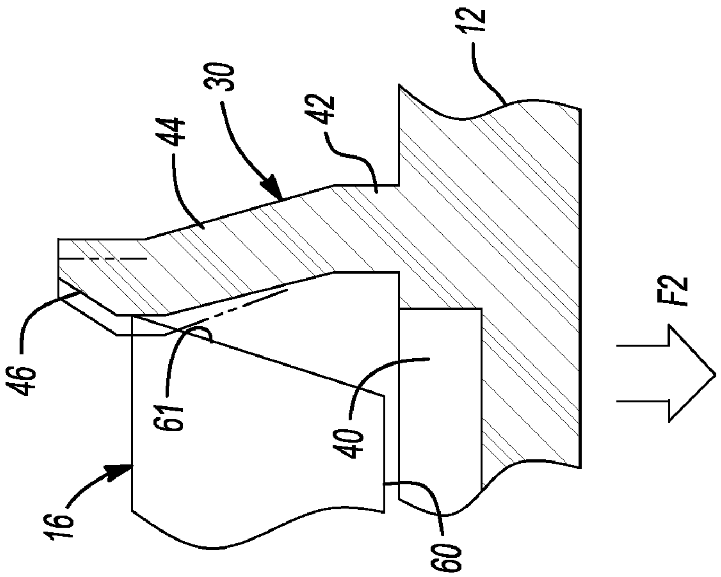
FIG. 9 is a partial cross-sectional view of the finger flexing to disengage the cover assembly according to the principles of the present disclosure.
Figure 10:
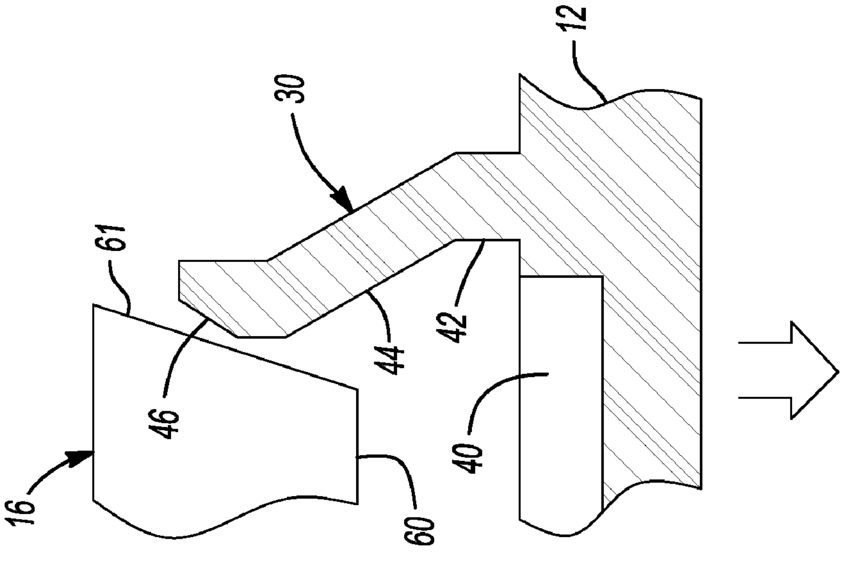
FIG. 10 is a partial cross-sectional view of the cover assembly fully disengaged from the finger according to the principles of the present disclosure.

The cover assembly 16 may be inserted into engagement with the fingers 30 by forcing the outer rim 61 against the lip portion 46, thereby causing the fingers 30 to flex outward to receive the cover assembly 16 (FIGS. 7 and 8). The generally inwardly angled fingers 30 allow the installation tool 10 to releasably engage different covers with a range of diameters.

In the fully engaged configuration (FIGS. 4, 5, and 8), the fingers 30 and the recess 40 may cooperate to releasably engage the outer rim 61 of the cover assembly 16, whereby the cover plate 60 may be seated in the recess 40 and the fingers 30 may be biased against the outer rim 56.

As shown in FIG. 1, the operator 18 may grasp the extension member 14 and raise the body portion 12 (with the cover assembly 16 releasably retained thereon) towards the sprinkler assembly 20 in the ceiling 24. An upward force F1 may be applied to the extension member 14 along the longitudinal axis X (FIG. 5) to remotely press the sleeve 58 of the cover assembly 16 onto the neck portion 66 of the sprinkler assembly 20. The force F1 may be sufficient to press the protuberances 64 into engagement with the one or more ribs 68, placing the cover assembly 16 in an installed position (FIG. 5). A force can then be applied to the extension member in a rotary direction to remotely adjust the cover assembly into contact with the ceiling surface by threading the cover assembly further onto the neck portion 66.

Once the cover assembly 16 is pressed into engagement with the sprinkler assembly 20, a downward force F2 may be applied to the extension member 14 along the longitudinal axis X to release the cover assembly 16 from engagement with the plurality of fingers 30 (FIG. 6). It should be noted that the length of the fingers 30 can be chosen to prevent interference with the ceiling 24.

As the downward force F2 is applied to the extension member 14, the biasing force of the fingers 30 against the outer rim 61 of the cover assembly 16 may be insufficient to retain the cover assembly 16 due to an engagement force between the protuberances 64 of the cover assembly 16 and the one or more ribs 68 of the sprinkler assembly 20. Accordingly, the cover assembly 16 may be retained in the installed position (FIGS. 5 and 6), as the installation tool 10 moves downward in response to the downward force F2, causing the fingers 30 to resiliently flex outward about the stems 42 to release the cover assembly 16 (FIGS. 8-10), whereby the cover assembly 16 may maintain installed engagement with the sprinkler assembly 20.

The description of the present disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A tool for installing a sprinkler cover comprising:
- an elongated member;
- a body portion disposed on an end portion of said elongated member; and
- at least one finger protruding from said body portion,
- said sprinkler cover being releasably engaged with said body portion and said at least one finger;
- wherein said body portion forces said sprinkler cover into an installed position in response to a force in a first direction and disengages said sprinkler cover in response to a force in a second direction,
- wherein said at least one finger protrudes from said body portion at an inward angle.

2. The tool for installing said sprinkler cover according to claim 1, wherein said at least one finger is biasingly flexible about a stem portion of said at least one finger.

3. The tool for installing said sprinkler cover according to claim 1, wherein said at least one finger includes a lip portion disposed at an outward angle.

4. The tool for installing said sprinkler cover according to claim 1, wherein said elongated member is received in a neck portion of said body portion.

5. The tool for installing said sprinkler cover according to claim 1, wherein said elongated member is extendable.

6. The tool for installing said sprinkler cover according to claim 1, wherein said at least one finger is integrally formed with said body portion.

7. The tool for installing said sprinkler cover according to claim 1, wherein said body portion includes an annular cavity disposed radially outward relative to a neck portion of said body portion.

8. A tool for installing a sprinkler cover comprising:

an elongated member;

a body portion disposed on an end portion of said elongated member; and at least one finger protruding from said body portion, said sprinkler cover being releasably engaged with said body portion and said at least one finger, wherein said body portion forces said sprinkler cover into an installed position in response to a force in a first direction and disengages said sprinkler cover in response to a force in a second direction, wherein said body portion includes a recess including a substantially planar surface and adapted to receive said sprinkler cover such that a planar surface of said sprinkler cover abuts said planar surface of said recess.

9. The tool for installing said sprinkler cover according to claim 8, wherein a plurality of fingers protrude from said body portion and are radially spaced apart from said recess.

10. An installation tool comprising:

an elongated member;

a body portion including a cavity and a recess, said recess being open at a first end and closed at a second end, said second end including a substantially planar surface, said cavity receiving at least a portion of said elongated member; and a plurality of resiliently flexible fingers attached to said body portion and protruding radially inward therefrom, said plurality of fingers being adapted to releasably engage a cover plate of a sprinkler system, wherein said plurality of fingers and said planar surface are adapted to cooperate to maintain said cover plate in a substantially parallel alignment relative to said planar surface, wherein said plurality of fingers are radially spaced apart from said recess.

11. The installation tool according to claim 10, wherein said elongated member is telescopically extendable.

12. The installation tool according to claim 10, wherein said body portion includes an annular cavity disposed radially outward relative to a neck portion of said body portion.

13. The installation tool according to claim 10, wherein said recess is adapted to receive said cover plate such that a planar surface of said cover plate abuts said planar surface of said recess.

14. The installation tool according to claim 10, wherein said plurality of fingers include a lip portion disposed at an outward angle.

15. The installation tool according to claim 10, wherein said plurality of fingers and said body portion cooperate to retain said cover plate in a first direction and allow disengagement of said cover plate in a second direction.

16. The installation tool according to claim 10, wherein said cover plate is pressed into releasable engagement with said plurality of fingers.

17. The installation tool according to claim 10, wherein each of said plurality of fingers are flexible about a stem portion of each of said plurality of fingers.

18. The installation tool according to claim 10, wherein said plurality of fingers are integrally formed with said body portion.

* * * * *